(12) United States Patent
Kato (10) Patent No.: US 10,158,235 B2
(45) Date of Patent: Dec. 18, 2018

(54) NON-CONTACT POWER TRANSMITTING DEVICE

(71) Applicant: TOSHIBA TEC KABUSHIKI KAISHA, Tokyo (JP)

(72) Inventor: Masakazu Kato, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 261 days.

(21) Appl. No.: 14/844,288

(22) Filed: Sep. 3, 2015

(65) Prior Publication Data

US 2016/0072307 A1 Mar. 10, 2016

(30) Foreign Application Priority Data

Sep. 8, 2014 (JP) ................................. 2014-181905

(51) Int. Cl.
| | | |
|---|---|---|
| *H01F 27/42* | (2006.01) | |
| *H02J 5/00* | (2016.01) | |
| *H02J 50/12* | (2016.01) | |
| *H02J 50/90* | (2016.01) | |
| *H02J 7/02* | (2016.01) | |
| *H02J 7/00* | (2006.01) | |

(52) U.S. Cl.
CPC .............. *H02J 5/005* (2013.01); *H02J 50/12* (2016.02); *H02J 50/90* (2016.02); *H02J 7/0042* (2013.01); *H02J 7/025* (2013.01); *H02J 2007/0001* (2013.01)

(58) Field of Classification Search
CPC .. H02J 5/005; H02J 50/90; H02J 50/12; H02J 7/0042; H02J 7/025

USPC .................................. 307/104; 320/107–115
See application file for complete search history.

(56) References Cited

U.S. PATENT DOCUMENTS

| | | | |
|---|---|---|---|
| 6,972,543 | B1 | 12/2005 | Wells |
| 7,741,734 | B2 | 6/2010 | Joannopoulos et al. |
| 7,825,543 | B2 | 11/2010 | Karalis et al. |
| 8,022,576 | B2 | 9/2011 | Joannopoulos et al. |

(Continued)

FOREIGN PATENT DOCUMENTS

| | | |
|---|---|---|
| CN | 101630857 A | 1/2010 |
| JP | 2010028934 A | 2/2010 |
| JP | 2010028969 A | 2/2010 |

OTHER PUBLICATIONS

First Office Action issued in CN201510491017.6 dated Feb. 23, 2018.

*Primary Examiner* — Thomas Skibinski (74) *Attorney, Agent, or Firm* — Patterson & Sheridan, LLP (57) ABSTRACT

A non-contact power transmitting device includes a power receiving device that includes a rectification circuit, a voltage converting circuit, and a switching circuit for connecting or disconnecting the voltage converting circuit to or from a load circuit, and a power transmitting device that includes a power transmitting circuit, a detection circuit that detects a current that is supplied to the power transmitting circuit, and a determination circuit that compares the detected current value with a threshold current set in advance, and determines whether the load circuit of the power receiving device is in contact with the power transmitting device, where the power transmitting device transmits power to the power receiving device in a non-contact manner.

14 Claims, 5 Drawing Sheets

(56) References Cited

U.S. PATENT DOCUMENTS

| | | |
|---|---|---|
| 8,169,185 B2 | 5/2012 | Partovi et al. |
| 9,106,096 B2 | 8/2015 | Kato |
| 2010/0013432 A1 | 1/2010 | Toya et al. |
| 2011/0049995 A1 | 3/2011 | Hashiguchi |
| 2012/0293006 A1* | 11/2012 | Kim ................... H04B 5/0031 307/104 |
| 2012/0326524 A1* | 12/2012 | Matsumoto ......... H01M 10/425 307/104 |
| 2013/0099586 A1 | 4/2013 | Kato |
| 2013/0313911 A1* | 11/2013 | Bae ...................... H01F 38/14 307/104 |
| 2014/0191584 A1 | 7/2014 | Kato |
| 2015/0015080 A1 | 1/2015 | Kato et al. |
| 2015/0015082 A1 | 1/2015 | Kanagawa et al. |

\* cited by examiner

FIG. 5

NON-CONTACT POWER TRANSMITTING DEVICE

CROSS-REFERENCE TO RELATED APPLICATION

This application is based upon and claims the benefit of priority from Japanese Patent Application No. 2014-181905, filed Sep. 8, 2014, the entire contents of which are incorporated herein by reference.

FIELD

Embodiments described herein relate generally to a non-contact power transmitting device that transmits power from a power transmitting device to a power receiving device in a non-contact manner.

BACKGROUND

Recently, a non-contact power transmitting device that transmits power in a non-contact manner has been widely used. The non-contact power transmitting device includes a power transmitting device that transmits power and a power receiving device that receives the transmitted power. The power transmitting device transmits power to the power receiving device in a non-contact manner through electromagnetic coupling, such as electromagnetic induction or magnetic resonance. The power receiving device includes a drive circuit that drives the power receiving device, and a load unit, such as a charging circuit of a secondary battery, which is mounted on the power receiving device.

The related art includes a non-contact power transmitting device that transmits power from a power transmitting device to a power receiving device in a non-contact manner through electromagnetic coupling between the power transmitting device and the power receiving device. A mobile terminal that is a power receiving device receives power from a charger that is a power transmitting device in a non-contact manner, and charges a secondary battery embedded in the mobile terminal.

In addition, authentication of whether the mobile terminal is correctly mounted on the charger is performed through communication using electromagnetic coupling between the charger and the mobile terminal mounted on the charger. When it is determined that the mobile terminal is correctly mounted on the charger, the mobile terminal is set as an appropriate power transmission target, and thus continuous normal power transmission is started.

Load modulation is used as a communication mechanism for authentication. The mobile terminal includes a load modulation unit. When data is transmitted from the mobile terminal to the charger, the load modulation unit changes a load thereof (internal resistance value) according to the data being transmitted, which changes an induced voltage of a primary coil in the charger.

In order to demodulate the load-modulated data signal from the mobile terminal, a reception unit in the charger performs peak hold processing for an amplitude of the induced voltage of the primary coil, and determines whether the data from the mobile terminal is logic "0" or logic "1" by comparing a peak voltage to a threshold (voltage value).

When the power is transmitted to the mobile terminal that is in close contact with a charging stand, an electromagnetic induction method is widely used. In the electromagnetic induction method, a frequency of approximately 100 kilohertz (kHz) is often used for power transmission. With the frequency of approximately 100 kHz, it is possible to provide a method of observing a change of the amplitude of the induced voltage of the primary coil as demodulating mechanism disclosed in the related art.

DETAILED DESCRIPTION

In an electromagnetic induction method, when a power transmitting device is separated by approximately several centimeters (cm) from a power receiving device, power transmission efficiency is remarkably decreased. In contrast, in a non-contact power transmitting device using a magnetic resonance method, even when a power transmitting device is separated by approximately several cm from a power receiving device, power transmission efficiency may remain high. In the non-contact power transmitting device using the magnetic resonance method, a frequency of several MHz, for example, 6.78 MHz or 13.56 MHz is frequently used for power transmission. However, there is a technical problem in that, when the frequency is increased (equal to or higher than several MHz), it is difficult to detect a voltage that is induced to a transmission coil. Using a simple configuration, demodulation is hardly performed by the technology disclosed in the related art and authentication cannot be performed. Example embodiments described herein easily perform authentication between a power transmitting device and a power receiving device using a simple circuit configuration even at a high power transmission frequency of approximately several megahertz.

In general, according to one embodiment, a non-contact power transmitting device includes a power receiving device including a rectification circuit, a voltage converting circuit, and a switching circuit for connecting or disconnecting the voltage converting circuit to or from a load circuit; and a power transmitting device that includes a power transmitting circuit, a detection unit configured to detect a current that is supplied to the power transmitting circuit, and a determination circuit configured to compare the detected current value with a threshold current and determine whether the load circuit of the power receiving device is in contact with the power transmitting device, the power transmitting device configured to transmit power to the power receiving device in a non-contact manner.

Hereinafter, embodiments will be described with reference to the drawings. Meanwhile, the same symbols or reference numerals will be attached to the same configurations in the respective figures.

First Embodiment

Figure 1:
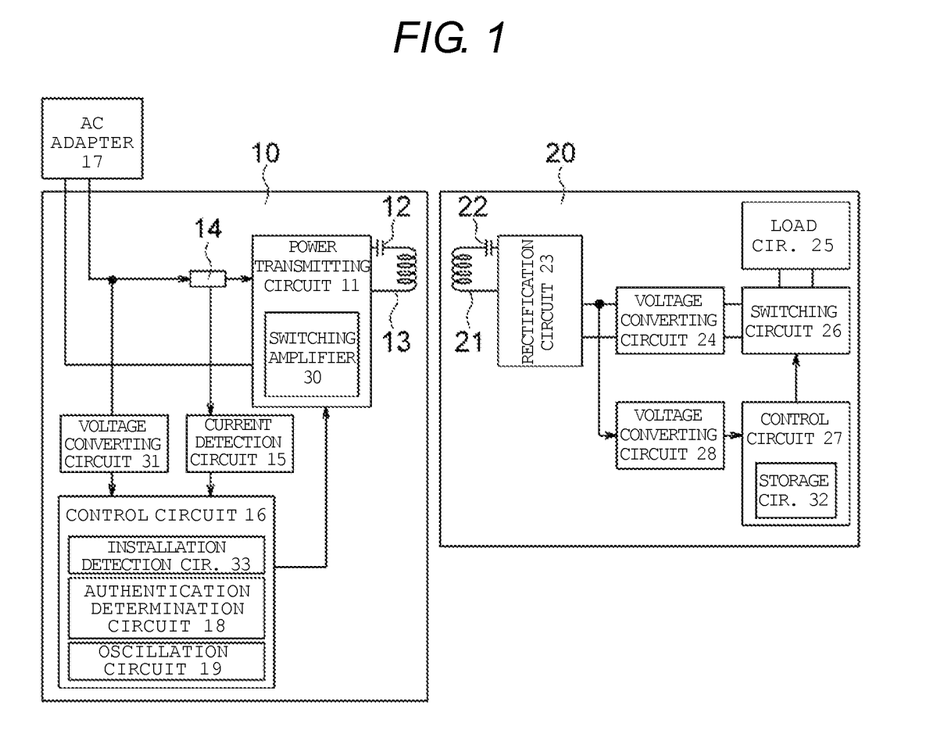
FIG. 1 is a block diagram illustrating a configuration of a non-contact power transmitting device according to a first embodiment.
Figure 2:
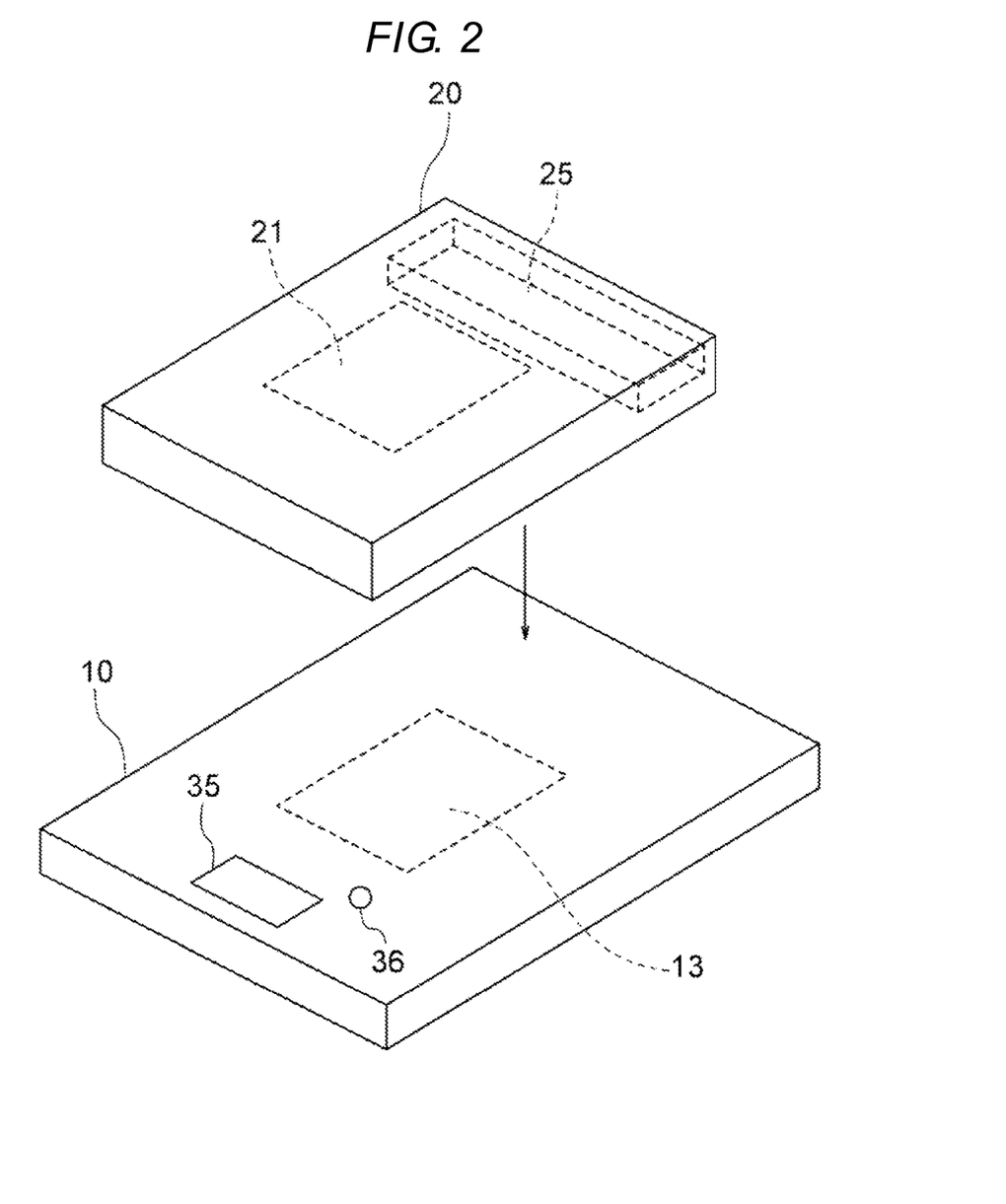
FIG. 2 is a perspective view illustrating a configuration of a power transmitting device according to the first embodiment.

FIG. 1 is a block diagram illustrating a configuration of a non-contact power transmitting device according to a first embodiment. FIG. 2 is a perspective view schematically illustrating a power transmitting device and a power receiving device that configure a non-contact power transmitting device. As illustrated in FIG. 1, the non-contact power transmitting device includes a power transmitting device 10 that transmits power, and a power receiving device 20 that receives the transmitted power. The power that is output from a power transmitting circuit 11 is transmitted to the power receiving device 20 through electromagnetic coupling, such as through electromagnetic induction or magnetic resonance, between a power transmitting coil 13 and a power receiving coil 21.

The power transmitting device 10 receives DC power through an AC adapter 17 from an external device (not shown). The power transmitting device 10 includes a power transmitting circuit 11 that generates AC power, a resonance circuit that includes a capacitor 12 and a power transmitting coil 13, a current sensor 14 that detects a DC current that is input from the AC adapter 17 to the power transmitting circuit 11, a current detection circuit 15 that amplifies a small signal that is detected by the current sensor 14, and a control circuit 16. The current sensor 14 and the current detection circuit 15 implement a current detector. The current sensor 14 is, for example, a small resistor or the like. The control circuit includes an installation detection circuit 33, an authentication determination circuit 18, an oscillation circuit 19.

The power transmitting circuit 11 generates AC power with a frequency equal to or substantially equal to a self-resonance frequency of the resonance circuit that includes the capacitor 12 and the power transmitting coil 13. The power transmitting circuit 11 includes a field effect transistor (FET) that is a switching element (not shown), and the FET is turned on or off by an output of the oscillation circuit 19 in the control circuit 16. That is, the power transmitting circuit 11 includes an amplifier 30 of switching type, such as a class E amplifier. An oscillation frequency of the oscillation circuit 19 has a value equal to or substantially equal to the self-resonance frequency of the resonance circuit that includes the capacitor 12 and the power transmitting coil 13. The present embodiment provides a power transmitting device using magnetic field resonance of 6.78 megahertz (MHz).

The frequency of AC power that is generated by the power transmitting circuit 11 for transmitting power is approximately 100 kHz, when using an electromagnetic induction coupling, and is several MHz to dozens of MHz when using a magnetic field resonance coupling. Frequency of 6.78 MHz or 13.56 MHz is mainly used with magnetic field resonance coupling, but the frequency of power transmission is not limited to such values.

A voltage conversion circuit 31 converts an output voltage of the AC adapter 17 into a voltage appropriate for a circuit operation of each circuit in the control circuit 16. After conversion, the voltage is supplied to the control circuit 16 in the power transmitting device 10.

The power receiving device 20 includes a resonance element that includes a power receiving coil 21 and a capacitor 22, a rectification circuit 23 that converts an AC current that is generated by the resonance element into a DC current, and a voltage converting circuit 24 that converts a DC voltage that is output from the rectification circuit 23 into a desired DC current. The power receiving device 20 includes a load circuit 25, which operates according to the DC current that is converted by the voltage converting circuit 24. The power receiving device 20 further includes a switching circuit 26 that connects or disconnects the voltage converting circuit 24 to or from the load circuit 25. Control of connection and disconnection is performed by a control circuit 27 such as a microcontroller. The control circuit 27 also includes a storage circuit 32 that stores patterns of connection and disconnection of the switching circuit 26. The voltage converting circuit 28 converts an output of the rectification circuit 23 into a DC voltage required for the control circuit 27.

A self-resonance frequency of a resonance circuit that includes the power receiving coil 21 and the capacitor 22 in the power receiving device 20 is equal to or substantially equal to a self-resonance frequency of the resonance circuit that includes the capacitor 12 and the power transmitting coil 13 in the power transmitting device 10. The power transmitting coil 13 and the power receiving coil 21 are electromagnetically coupled to each other, and thereby power is efficiently transmitted from a power transmission side to a power reception side. In the present embodiment, the power receiving device resonates at 6.78 MHz, which is equal to the frequency of the power transmitting device 10.

The load circuit 25 is a circuit of an electronic apparatus, such as a mobile terminal or tablet terminal. Power that is received by the power receiving device 20 is used for an operation of the electronic apparatus, charging of a battery embedded in the electronic apparatus, or the like. The load circuit 25 may be provided inside the power receiving device (FIG. 2), or may be provided separately from the power receiving device 20, depending on a configuration of the apparatus.

The capacitors 12 and 22 do not need to include electronic components. Instead of discrete capacitors, capacitances between lines of each coil or the like may be used, depending on shapes of the power transmitting coil 13 or the power receiving coil 21. In addition, in FIG. 1, a serial resonance circuit is configured in which the capacitor 12 is connected in series to the power transmitting coil 13 and the capacitor 22 is connected in series to the power receiving coil 21. Instead of the serial resonance circuit, a parallel resonance circuit in which a capacitor is connected in parallel with a coil may be used.

As illustrated in FIG. 2, the power receiving device 20 is arranged over the power transmitting device 10 in a direction illustrated by the solid arrow to implement the non-contact power transmitting device of FIG. 1. By overlapping the power receiving coil 21 over the power transmitting coil 13 of the power transmitting device 10, power is transmitted to the power receiving device 20. That is, driving an AC current through the power transmitting coil 13, an electric field occurs in the power transmitting coil 13. Meanwhile, an AC current flows through the power receiving coil 21 through the electromagnetic coupling, and by rectifying the current, power may be obtained. The obtained power is supplied to the load circuit 25. A liquid crystal panel 35 that displays a power transmission state, and a light emitting diode (LED) 36 that is a warning lamp, are mounted in the power transmitting device 10.

In FIG. 2, the power transmitting device 10 is formed of a case of a plate shape on which the power receiving device 20 is mounted, and includes the power transmitting coil 13 in an upper portion (a side close to the power receiving device 20) within the case. The power receiving device 20 includes a case having a plate shape, and is configured to be mounted on the power transmitting device 10. Within the power receiving device 20, the power receiving coil 21 is arranged in a lower portion (a side close to the power transmitting device 10) within the case to face the power transmitting coil 13. It is preferable that the power transmitting coil 13 is close to the power receiving coil 21, but since there are cases of the power transmitting device 10 and the power receiving device 20, and covers that protect the devices 10 and 20, the power transmitting coil 13 and the power receiving coil 21 may also be separated from each other by several cm.

An authentication operation of the non-contact power transmitting device will be described with reference to a sequence in FIG. 3 and a timing chart in FIG. 4.

The power transmitting device 10 intermittently transmits the power at first, when the power supply is activated. In order to detect whether or not the power receiving device 20 is mounted on the power transmitting device 10, the power transmitting device 10 intermittently transmits, and repeats intermittent power transmission, until it is determined whether the power receiving device 20 is mounted on the power transmitting device 10 (ACT101).

The determination of whether the power receiving device 20 is mounted on the power transmitting device 10 is performed by the installation detection circuit 33 in the control circuit 16. The current sensor 14 converts a transmitted current that is supplied to the power transmitting circuit 11 into a voltage, and the current detection circuit 15 amplifies the voltage that is induced to the current sensor 14. In an embodiment, a shunt resistor with a very small resistance value is used as the current sensor 14. The installation detection circuit 33 in the control circuit 16 converts the detected voltage into a current flowing through the current sensor 14, and compares the current with a threshold current that is determined in advance. When the detected current exceeds the threshold current, it is determined that the power receiving device 20 is mounted on the power transmitting device 10. When the detected current does not exceed the threshold current, it is determined that the power receiving device 20 is not mounted on the power transmitting device 10.

The power transmitting circuit 11 in the power transmitting device 10 uses an amplifier of a switching type, such as a class E amplifier. The FET in the power transmitting circuit 11 is switched in accordance with a frequency equal to or substantially equal to the self-resonance frequency of the resonance circuit that includes the capacitor 12 and the power transmitting coil 13, and thus a magnitude of the current that is supplied to the power transmitting circuit 11 from the AC adapter 17 is changed depending on a magnitude of the current that is supplied to the power receiving device 20.

For this reason, when the power receiving device 20 is not on the power transmitting device 11, the power that is transmitted from the power transmitting device 10 is decreased, and thus, transmitted current is decreased. When the power receiving device 20 is mounted on the power transmitting device 10, the power that is transmitted from the power transmitting device 10 is increased, and at the same time, the transmitted current is increased. For this reason, when the threshold of the transmitted current is set in advance, it is possible to detect whether the power receiving device 20 is mounted, by detecting whether the transmitted current is more than the threshold.

When an amplifier with a constant output is used for the power transmitting circuit 11, the current that is supplied to the power transmitting circuit 11 is substantially constant, and thus, by changing the transmitted current that is supplied to the power transmitting circuit 11, it is possible to determine whether the power receiving device 20 is mounted. For this reason, an amplifier that is used for the power transmitting circuit 11 need not be limited to an amplifier of a switching type, such as a class E amplifier, but can be an amplifier having a configuration in which the transmitted current is changed depending on the magnitude of a load.

As transmission interval at the time of intermittent transmission, the power is transmitted for approximately 0.1 seconds once every 10 seconds, and then whether the power receiving device 20 is mounted is checked. When it is necessary to immediately detect whether the power receiving device 20 is mounted, the transmission interval may be further reduced. In contrast to this, when it is not necessary to immediately detect whether the power receiving device 20 is mounted, the transmission interval may be increased within an allowable range. When the transmission interval is increased, there is an advantage that power consumption of the power transmitting device 10 at the time of intermittent transmission may be reduced. However, until the detection is made, the transmission interval and the detection time have a trade-off relationship.

Figure 3:
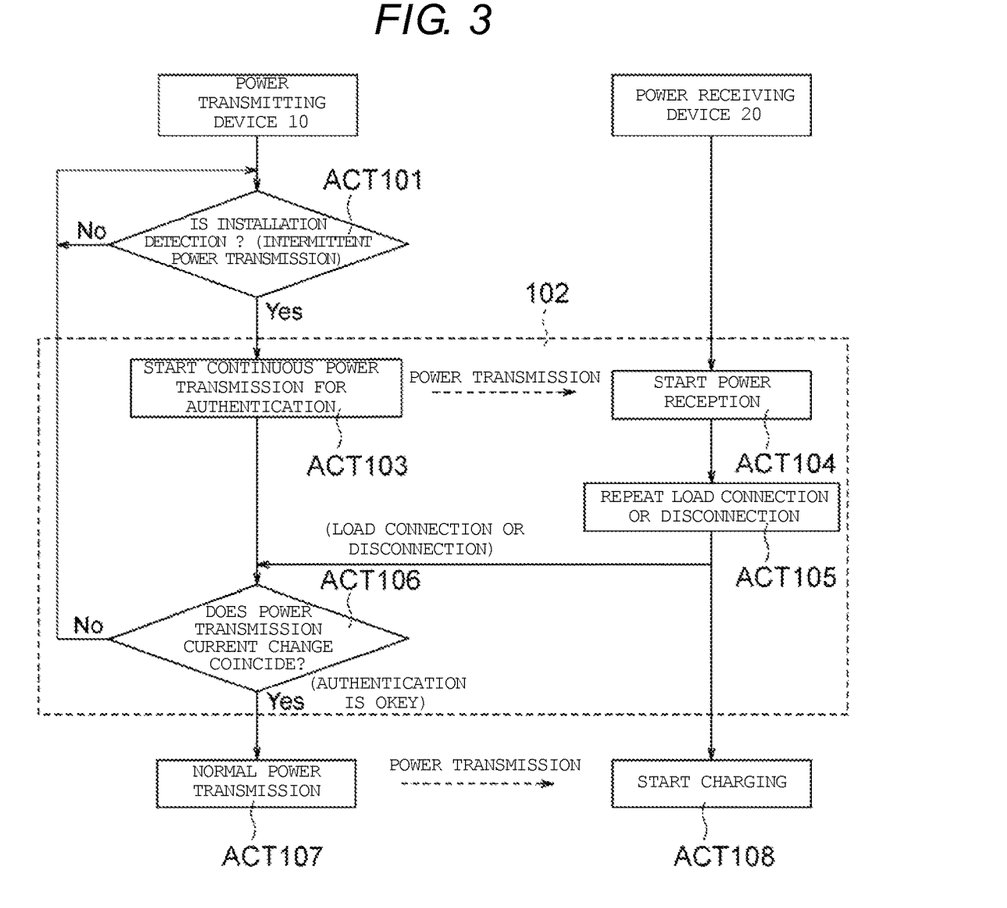
FIG. 3 is a sequence diagram illustrating an operation of the non-contact power transmitting device according to the first embodiment.
Figure 4:
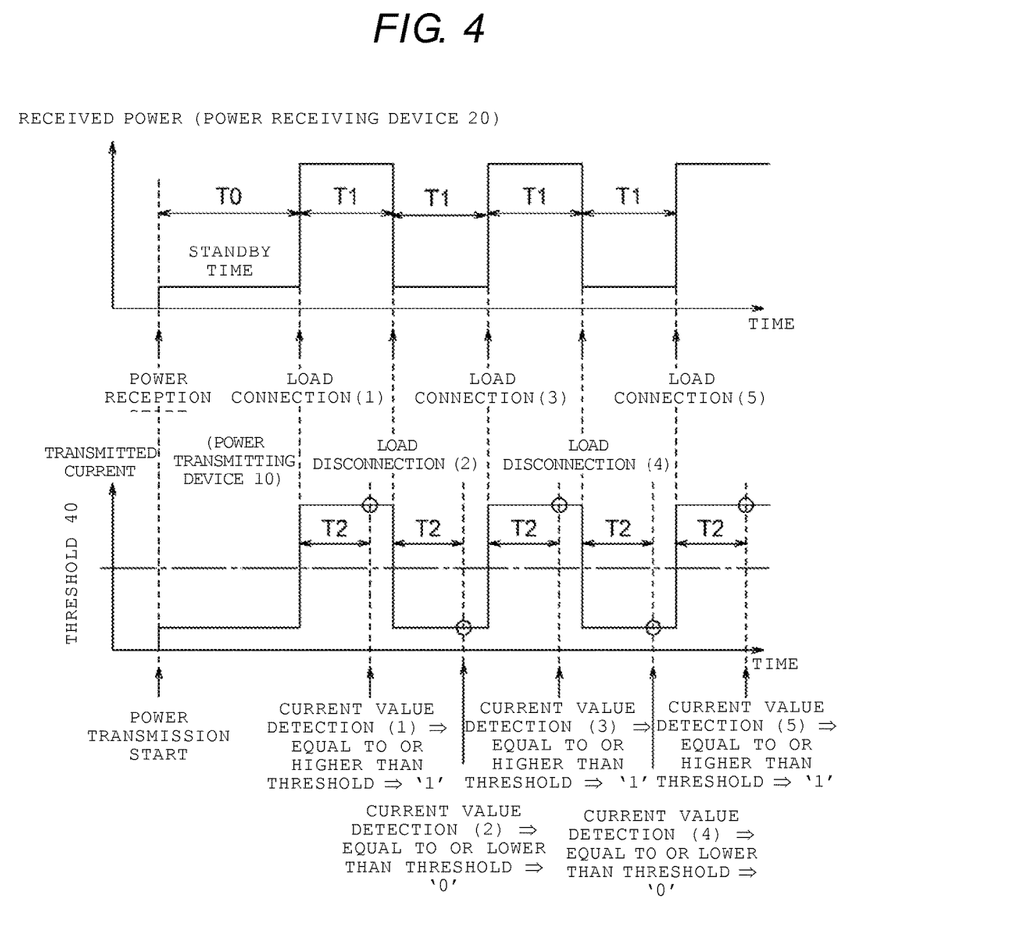
FIG. 4 is a timing diagram illustrating the operation of the non-contact power transmitting device according to the first embodiment.

When it is detected that the power receiving device 20 is mounted on the power transmitting device 10, an authentication operation 102 is performed as illustrated in FIG. 3.

The power transmitting device 10 first starts continuous power transmission for authentication (ACT103). The continuous power transmission for authentication is the same operation as a normal continuous power transmission, but for the sake of safety, when authentication is completed within a predetermined time, the power transmission is stopped. The configuration according to the present embodiment includes so-called time-out in which the power transmission is stopped when the authentication is not completed within a predetermined time, but the time-out may not be set.

The power receiving device 20 receives the continuous power transmission for authentication (ACT103) from the power transmitting device 10, and starts the power reception (ACT104). When the power reception is started, a connection operation or a disconnection operation of the load is first performed for authentication (ACT105). Here, the connection operation or the disconnection operation is performed according to a pattern that is determined in advance. The pattern is stored in the storage circuit 32 in the control circuit 27, controls the switching circuit 26, and connects or disconnects the load circuit 25. The pattern described above is a communication rule or the like that is necessary for the power transmitting device 10 to authenticate the power receiving device 20 and is determined in advance. In the present embodiment, the pattern specifies a time (standby time T0) elapsed until the load circuit 25 is connected after the power reception illustrated in FIG. 4 is started, a time T1 elapsed until the load is disconnected after being connected, the number of repetitions from the load connection to the load disconnection, or the like.

When the switching circuit 26 connects the load circuit 25 to the voltage converting circuit 24, the power that is transmitted from the power transmitting device 10 to the power receiving device 20 increases, and at the same time, the transmitted current that is supplied to the power transmitting circuit 11 also increases. An increase or a decrease of the current that is supplied to the power transmitting circuit 11 is detected by the current sensor 14 and a current detection circuit 15. In contrast to this, when the load circuit 25 is disconnected, the power that is consumed by the power receiving device 20 is decreased, and thus the power that is transmitted from the power transmitting device 10 to the power receiving device 20 is decreased, and at the same time, the transmitted current that is supplied to the power transmitting circuit 11 also decreases.

In the power transmitting device 10, the threshold 40 of the transmitted current is set in advance. It is detected whether the transmitted current exceeds the threshold that is set, and it is determined whether the transmitted current is changed depending on the pattern that is set in advance (ACT106). When the change of the transmitted current coincides with the pattern, it is determined that authentication is established. That is, it is determined that the power receiving device 20 is correctly mounted on the power transmitting device 10 as originally placed, and thus a normal transmission is started (ACT107).

When the change of the transmitted current does not coincide with the pattern, it is determined that the authentication is not established. That is, it is determined that the power receiving device 20 is incorrectly mounted on the power transmitting device 10 as originally placed. When the power receiving device 20 is incorrectly mounted, installation detection is performed again (ACT101), but alternatively, the power transmission is stopped and a message indicating that the power receiving device 20 is incorrectly mounted is presented to a user. As the message, the LED 36 included in the power transmitting device 10 is made to blink, and error is displayed on the display device 35. When a correct authentication is established, the condition of normal charging is displayed.

When the authentication is established, and thereby a normal transmission is performed, the power receiving device 20 starts charging a secondary battery of the load circuit 25 embedded in the power receiving device 20 (ACT108).

An authentication operation 102 will be described with reference to the timing diagram in FIG. 4. FIG. 4 is a timing chart illustrating a relationship between the received power of the power receiving device 20 and time, and is a timing chart illustrating a relationship between the transmitted current flowing through the current sensor 14 of the power transmitting device 10 and time.

For the transmitted current of the power transmitting device 10, the threshold 40 for authentication is set in advance. In FIG. 3, when the continuous power transmission for authentication is started (ACT103), the power reception is started at the same time as the power transmission start, as illustrated in FIG. 4. At a time point of the power transmission start, the power receiving device 20 is in a state in which the load circuit (secondary battery) 25 is disconnected, and thus the transmitted current and the received power have small values. After a standby time T0, at the timing of the load connection (1), the power receiving device 20 switches the switching circuit 26 in such a manner that the load circuit 25 is connected to the voltage converting circuit 24 by the control circuit 27. When the load circuit 25 is connected, the transmitted current of the power transmitting device 10 and the received power of the power receiving device 20 increase together. At this time, the transmitted current exceeds the threshold 40. The standby time T0 is set as 150 ms for stability.

After a predetermined time T2 elapses from the connection of the load circuit 25, that is, at the time of timing of the current value detection (1), the power transmitting device 10 compares the transmitted current value with the threshold 40. During the current value detection (1), the transmitted current is more than the threshold 40, and thus it is determined to be '1'. The time T2 is set as 70 ms. When the transmitted current value is detected immediately after the load connection (1), there is a probability that the current value is not stable, and thus an appropriate delay time T2 is set. Since the current detection value exceeds the threshold 40, the power transmitting device 10 recognizes that the load circuit 25 of the power receiving device 20 is connected.

At the timing of the load disconnection (2) after a preset time T1 elapses from the timing of the load connection (1), the power receiving device 20 disconnects the load circuit 25 by controlling the switching circuit 26. The time T1 is set as 100 ms. When the load circuit 25 is disconnected at the load disconnection (2), the power that is consumed in the power receiving device 20 is decreased, and thus when the transmitted current is decreased, the transmitted power is simultaneously decreased as well. In the same manner as a case of the load connection (1), the power transmitting device 10 compares the transmitted current value with the threshold 40 at the timing of the current value detection (2) in which the appropriate delay time T2 elapses from the timing of the load disconnection (2) in which the load circuit 25 is disconnected. In this case, the transmitted current is less than the threshold 40, and thus it is determined to be '0'. An interval between the current value detection (1) and the current value detection (2) is set to be equal to approximately the time T1. Since the current detection value is less than the threshold 40, the power transmitting device 10 recognizes that the load circuit 25 of the power receiving device 20 is disconnected.

Next, at a timing of a load connection (3) after the time T1 from the timing of the load disconnection (2), the power receiving device 20 connects the load circuit 25 by controlling the switching circuit 26. In the same manner as the operation performed so far, the power transmitting device 10 detects a current value at the timing of a current value detection (3), and it is determined to be '1' because of a value equal to or higher than the threshold 40.

The above-described operation is performed in accordance with the pattern of the load connection and disconnection, and thus the power transmitting device 10 may obtain a detection pattern of the transmitted current. In the example illustrated in FIG. 4, a pattern of "10101" is obtained. The pattern is compared with a pattern that is stored in advance in the authentication determination circuit 18 of the power transmitting device 10, and when the patterns coincide with each other, the authentication is established.

The timings of (1) to (5) in which the power transmitting device 10 detects a current value triggers the start (ACT103) of the continuous power transmission for authentication, and thus the timings may be set in advance. As another method, the interval in which the power transmitting device 10 connects or disconnects the load is set as T1. Thus, the transmitted current is detected at the time T1, and it may be confirm whether the detected current coincides with the pattern ("10101" in the example of FIG. 4) that is stored in advance. The method of confirming coincidence of the timing of the current value detection or the pattern is not limited to the method described above. For example, a method of obtaining a detection pattern by detecting a continuous current value at a timing of half of T1 or at a timing of a shorter interval may also be adopted.

In the example described above, the power receiving device 20 alternately performs connection and disconnection of the load, and in addition the pattern corresponds to five bits. While not being limited to this, the device may also apply a pattern of arbitrary connection or disconnection that is set in advance and an arbitrary bit length. For example, in order to avoid authentication error, a connection or disconnection pattern of ten bits or more may be adopted.

According to the authentication method of the present application, authentication between a power transmitting device and a power receiving device may be easily performed by a simple circuit configuration, even at a high power transmission frequency of not only, for example, 100 kHz, but also approximately several MHz, regardless of a frequency that is used for power transmission. Particularly, when power is transmitted at a high carrier frequency, such as several MHz or several gigahertz (GHz), it is possible to perform the authentication between the power transmitting device and the power receiving device using a simple configuration without using a complicated circuit configuration.

Second Embodiment

Figure 5:
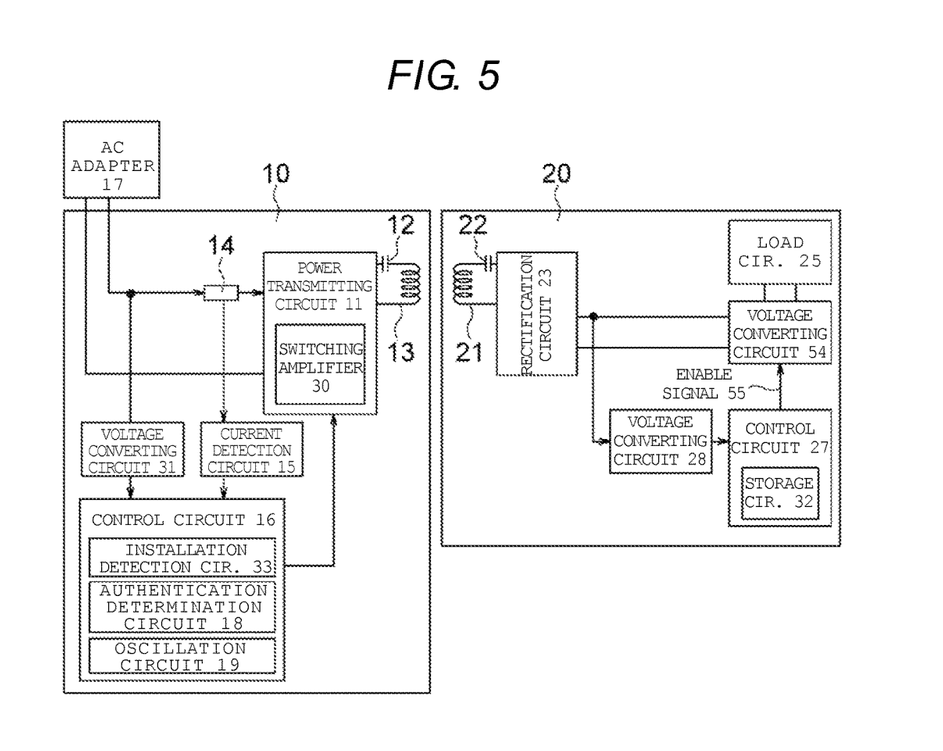
FIG. 5 is a block diagram illustrating a configuration of a non-contact power transmitting device according to a second embodiment.

A second embodiment will be described with reference to FIG. 5. In the second embodiment, a voltage converting circuit 54 of the power receiving device 20 includes an enable function. That is, the switching circuit 26 illustrated in FIG. 1 is replaced with an enable function of the voltage converting circuit 54. Other configurations other than a configuration in which the voltage converting circuit 54 receives an enable signal 55 and performs connection and disconnection of the load unit 25, without using the switching circuit 26, are the same as the configuration of the first embodiment.

The voltage converting circuit 54 that converts a DC voltage that is input from the rectification circuit 23 of the power receiving device 20 into a desired DC voltage is formed by an integrated circuit (IC). The IC has a function of enabling or disabling the function of a voltage conversion. By controlling an enable terminal of the IC that configures the voltage converting circuit 54, it is possible to switch on or off an operation of the voltage converting circuit 54.

In the present embodiment, the control circuit 27 generates the enable signal 55 that controls the voltage converting circuit 54 according to the pattern for authentication, and controls connection and disconnection of the voltage converting circuit 54. A control or timing for authenticating the power receiving device 20 is the same as in the case described in the first embodiment.

In the configuration according to the second embodiment, the switching circuit 26 illustrated in FIG. 1 is not required, and it is possible to perform authentication between a power transmitting device and a power receiving device using a simpler configuration.

The authentication method of the present application is not limited to a frequency that is used for non-contact power transmission performed by electromagnetic coupling, and may easily perform authentication between a power transmitting device and a power receiving device.

The authentication method of the present application is effective for an apparatus that is specified by an authentication ID, such as a mobile phone having a battery of a charging type, a mobile terminal, a portable printer, or an electronic apparatus that operates by receiving power in a non-contact manner without a power cable. The electronic apparatus includes a personal computer, a cash register, accessory thereof (mouse, display device, key board, card reader, touch scanner, or the like), and the like. A non-contact power transmitting device not only mounts a power receiving device on a power transmitting device, but also may very conveniently transmit power to the power receiving device. For this reason, a cumbersome operation connecting a cable is not necessary. Meanwhile, absent authentication that the power receiving device is correctly mounted, power may be carelessly transmitted even to an unspecified apparatus. When using the authentication method of the present application, it is possible to prevent the power from being transmitted carelessly or wastefully.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A non-contact power transmitting device, comprising:
a power receiving device including a rectification circuit, a voltage converting circuit, a storage circuit in which an authentication pattern is stored, and a switching circuit, the switching circuit being configured to connect or disconnect the voltage converting circuit to or from a load circuit according to the authentication pattern stored in the storage circuit; and
a power transmitting device including a power transmitting circuit, a detection circuit configured to detect a current that is supplied to the power transmitting circuit, and a determination circuit configured to compare the detected current value with a threshold current to determine whether the load circuit of the power receiving device is connected or disconnected, the power transmitting device being configured to transmit power to the power receiving device in a non-contact manner.

2. The non-contact power transmitting device according to claim 1, wherein the power transmitting circuit includes an amplifier of a switching type.

3. The non-contact power transmitting device according to claim 1, wherein the power receiving device includes a power receiving coil and the power transmitting device includes a power transmitting coil, and wherein the power transmitting device is configured to transmit power to the power receiving device in a non-contact manner through electromagnetic coupling between the power transmitting coil and the power receiving coil.

4. The non-contact power transmitting device according to claim 3, wherein the electromagnetic coupling is electromagnetic induction coupling or magnetic resonance coupling.

5. The non-contact power transmitting device according to claim 3, wherein the power transmitting coil is coupled to a resonance circuit and wherein the power transmitted by the power transmitting device has a frequency substantially equal to a self-resonance frequency of the resonance circuit.

6. The non-contact power transmitting device according to claim 1, wherein when a pattern of changes in the detected current value matches the authentication pattern, the determination circuit determines that the power receiving device is correctly mounted on the power transmitting device.

7. The non-contact power transmitting device according to claim 1, wherein when a pattern of changes in the detected current value does not match the authentication pattern, the determination circuit determines that the power receiving device is incorrectly mounted on the power transmitting device.

8. The non-contact power transmitting device according to claim 1, wherein the detection circuit is configured to detect the current at a timing that is delayed with respect to a timing at which the switching circuit of the power receiving device connects or disconnects the voltage converting circuit to or from the load circuit.

9. A non-contact power transmitting device, comprising:
a power receiving device including a rectification circuit, a voltage converting circuit, a switching circuit for connecting or disconnecting the voltage converting circuit to or from a load circuit according to a first pattern, and a storage circuit configured to store the first pattern; and
a power transmitting device including a power transmitting circuit, a detection circuit configured to detect a current that is supplied to the power transmitting circuit, and a determination circuit configured to compare the detected current value with a threshold current to determine whether the load circuit of the power receiving device is connected or disconnected and to compare a second pattern of changes in the detected current value with the first pattern to determine whether or not the power receiving device is correctly mounted on the power transmitting device, the power transmitting device being configured to transmit power to the power receiving device in a non-contact manner.

10. The non-contact power transmitting device according to claim 9, wherein the power transmitting circuit includes an amplifier of a switching type.

11. The non-contact power transmitting device according to claim 9, wherein the power receiving device includes a power receiving coil and the power transmitting device includes a power transmitting coil, and wherein the power transmitting device is configured to transmit power to the power receiving device in a non-contact manner through electromagnetic coupling between the power transmitting coil and the power receiving coil.

12. The non-contact power transmitting device according to claim 11, wherein the electromagnetic coupling is electromagnetic induction coupling or magnetic resonance coupling.

13. The non-contact power transmitting device according to claim 11, wherein the power transmitting coil is coupled to a resonance circuit and wherein the power transmitted by the power transmitting device has a frequency substantially equal to a self-resonance frequency of the resonance circuit.

14. The non-contact power transmitting device according to claim 9, wherein the detection circuit is configured to detect the current at a timing that is delayed with respect to a timing at which the switching circuit of the power receiving device connects or disconnects the voltage converting circuit to or from the load circuit.

* * * * *